United States Patent [19]
Kido

[11] Patent Number: 5,145,022
[45] Date of Patent: Sep. 8, 1992

[54] SYSTEM AND METHOD FOR PIVOTALLY CONTROLLING VEHICLE REAR WHEELS

[75] Inventor: Tomoyuki Kido, Osaka, Japan

[73] Assignee: Daihatsu Motor Co., Ltd., Osaka, Japan

[21] Appl. No.: 612,915

[22] Filed: Nov. 14, 1990

[30] Foreign Application Priority Data

Nov. 15, 1989 [JP] Japan .................................. 1-297132
Nov. 15, 1989 [JP] Japan .................................. 1-297133
Dec. 26, 1989 [JP] Japan .................................. 1-339284

[51] Int. Cl.$^5$ ............................................ B62D 5/04
[52] U.S. Cl. .................................. 180/79.1; 180/142; 280/91; 364/424.05
[58] Field of Search ................. 180/79.1, 142; 280/91; 364/424.05

[56] References Cited

U.S. PATENT DOCUMENTS

| | | | |
|---|---|---|---|
| 4,538,698 | 9/1985 | Hashimoto et al. | 180/79.1 |
| 4,869,335 | 9/1989 | Takahashi | 180/140 |
| 4,943,074 | 7/1990 | Kido | 280/91 |
| 4,949,984 | 8/1990 | Uemura et al. | 280/91 |
| 4,953,650 | 9/1990 | Ohmura | 180/79.1 |
| 4,956,590 | 9/1990 | Phillips | 180/79.1 |
| 4,987,963 | 1/1991 | Oslapas et al. | 180/79.1 |
| 5,007,494 | 4/1991 | Ohmura et al. | 280/91 |

FOREIGN PATENT DOCUMENTS

| | | | |
|---|---|---|---|
| 60-67275 | 4/1985 | Japan . | |
| 60-44186 | 10/1985 | Japan . | |
| 306369 | 12/1989 | Japan | 280/91 |

Primary Examiner—Mitchell J. Hill
Attorney, Agent, or Firm—William H. Eilberg

[57] ABSTRACT

The present invention provides a rear wheel steering system for a vehicle comprising a controller to which driving information is supplied, and a rear wheel steering mechanism driven through a reduction mechanism by a DC electric motor which is rotationally controlled by the controller. The rotational amount of the motor is detected by a motor rotation sensor, and the motor can be stopped by an electromagnetic brake. For accurately stopping the motor at a target rotational position corresponding to a target pivotal angle for the rear wheels, the controller first interrupts the drive current to the motor when the detected rotational amount reaches a first value short of the target rotational position, and then actuates the brake when the detected rotational amount reaches a second value immediately short of the target rotational position.

16 Claims, 10 Drawing Sheets

SYSTEM AND METHOD FOR PIVOTALLY CONTROLLING VEHICLE REAR WHEELS

BACKGROUND OF THE INVENTION

1. Field of the Invention

This invention relates generally to four-wheel steering (4WS) vehicles. More particularly, the present invention relates to a system and method for pivotally controlling vehicle rear wheels for use in combination with a front wheel steering mechanism.

2. Description of the Prior Art

As is well known, various attempts have long been made to improve controllability of automobiles in various driving conditions. The four-wheel steering system is one example which has resulted from such attempts.

Japanese Patent Publication No. 60-44186 discloses a four-wheel steering system for a vehicle wherein the rotation of the steering wheel is mechanically transmitted to a rear wheel steering mechanism for causing the rear wheels to make a same or opposite phase pivotal movement depending on the rotational angle of the steering wheel from a neutral rotational position. The term "same phase pivotal movement" means that the rear wheels are pivoted in the same direction as the front wheels, whereas the term "opposite phase pivotal movement" means that the rear wheels are pivoted in the opposite direction relative to the front wheels.

According to the above Japanese patent publication, more specifically, the vehicle rear wheels are caused to make a same phase pivotal movement when the steering wheel is rotated from the neutral position within a predetermined small angular range. On the other hand, when the steering wheel is rotated beyond the predetermined range, the rear wheels are caused to make an opposite phase pivotal movement. The same phase pivotal movement of the rear wheels is suitable for cornering or lane-shifting during medium- or high-speed driving because the rear wheels can bear a part of the side force (as required to counteract the centrifugal force or lateral acceleration force) from the ground to stabilize the vehicle. The opposite phase pivotal movement of the rear wheels is suitable for making a U-turn or guiding the vehicle into a garage at a low speed since the thus oriented rear wheels reduce the turning radius of the vehicle.

In any of conventional 4WS systems wherein the rear wheel steering mechanism is mechanically connected to the front wheel steering mechanism, the pivotal angle for the rear wheels is inevitably determined in dependence only on the rotational angle of the steering wheel. Thus, such a 4WS system cannot take acount of the vehicle driving speed, and therefore does not necessarily provide reliable vehicle controllability.

In actual driving, it can occur that the steering wheel be rotated to a relatively large degree even when running at a medium- or high-speed. If the rear wheels are pivoted in the opposite phase direction in this driving condition, a dangerous situation will result. Such a dangerous situation may occur with a 4WS system wherein the pivotal angle for the rear wheels is determined only by the rotational angle of the steering wheel.

Indeed, the lateral acceleration force (centrifugal force), hence the side force (centripetal force) required to counteract the lateral acceleration force, is a function of the vehicle speed and the turning radius (determined by the rotational angle of the steering angle). Thus, in pivotally controlling the rear wheels, it is necessary to take acount of the vehicle speed as well as the rotational angle of the steering wheel in order to improve the controllability of the vehicle in medium- or high-speed running particularly. Further, it is also important, in realizing ideal vehicle controllability, that the rear wheels bear a suitable portion of the total side force at an optimum timing relative to the start of rotating the steering wheel.

Japanese Patent Application Laid-open No. 60-67275 discloses a 4WS system wherein the rear wheel steering mechanism is electrically or electronically controlled by monitoring the vehicle speed and the rotational angle of the steering wheel for control purposes. The rear wheel steering mechanism is driven by a stepping motor which is assisted by a hydraulic cylinder device. The cylinder device is added because the stepping motor alone is very low in output torque and therefore not enough to suitably pivot the rear wheels against the side force acting to pivotally return the rear wheels.

The 4WS system of the above laid-open Japanese application utilizes the vehicle speed as well as the rotational angle of the steering wheel to determine the pivotal angle for the rear wheels. Theoretically, therefore, such a 4WS system seems to solve the problems mentioned hereinbefore. In reality, however, this 4WS system has the following problems.

First, the stepping motor, though easy to accurately control its rotational amount, is incapable of providing a high-speed rotation. Thus, the stepping motor fails to quickly pivot the rear wheels for adaptation to the constantly changing driving condition particularly in high-speed running. Second, the stepping motor, because of the low torque, inevitably requires a power assist means such as hydraulic cylinder device for pivoting the rear wheels. Thus, the overall 4WS system becomes costly and complicated.

It is conceivable to substitute a DC electric motor, which can be made to have a high torque and a high rotational speed, for the stepping motor of the 4WS system of the above laid-open Japanese patent application. However, such replacement gives rise to a new problem that the rear wheels cannot be accurately pivoted to a target pivotal position. The reason for this is that the DC motor has a tendency to overrun beyond a target rotational position (corresponding to the target pivotal position of the rear wheels) due to inertial rotation even if the pivotal angle of the rear wheels is monitored to interrupt the drive current to the motor upon reaching the target rotational position.

SUMMARY OF THE INVENTION

It is, therefore, an object of the present invention to provide a system and method for pivotally controlling vehicle rear wheels which, while using a DC electric motor as a drive source, is capable of quickly and accurately pivoting the vehicle rear wheels to a target pivotal position.

Another object of the present invention is to enable stably holding the vehicle rear wheels at the target pivotal position even if external forces such as side force act to pivotally deviate the rear wheels from the target pivotal position.

According to the present invention, there is provided a rear wheel steering system for a vehicle comprising: a controller to which driving information is supplied; a DC electric motor which is rotationally controlled by the controller; a motor rotation sensor for detecting the rotational amount of the motor from a neutral position and feeding the detected rotational amount to the controller; a brake controlled by the controller for suitably braking the motor; a reduction mechanism connected to the motor; and a rear wheel steering mechanism connected to the reduction mechanism for pivoting the vehicle rear wheels in accordance with the rotational amount of the motor.

According to the arrangement described above, the DC motor provides a high-speed and high-torque rotation to enable the rear wheels to be quickly pivoted to a target pivotal position. The reduction mechanism further magnifies the rotational torque of the motor to an extent enough for overcoming the external forces resisting against intended pivotal movement of the rear wheels. The brake enables the motor to be forcibly stopped for accurately bringing the wheels to the target pivotal position. The brake may be also used for holding the rear wheels at the target pivotal position.

Preferably, the controller first interrupts the motor drive current when the detected rotational amount of the motor reaches a first value short of a target rotational amount set by the controller, and subsequently actuates the brake when the detected rotational amount of the motor reaches a second value immediately short of the target rotational amount. This manner of stopping the motor is advantageous because it is much easier to brake the motor in inertial rotation than in driving rotation.

Other objects, features and advantages of the present invention will be fully understood from the following detailed description given with reference to the accompanying drawings.

DETAILED DESCRIPTION OF THE PREFERRED EMBODIMENTS

Figure 1:
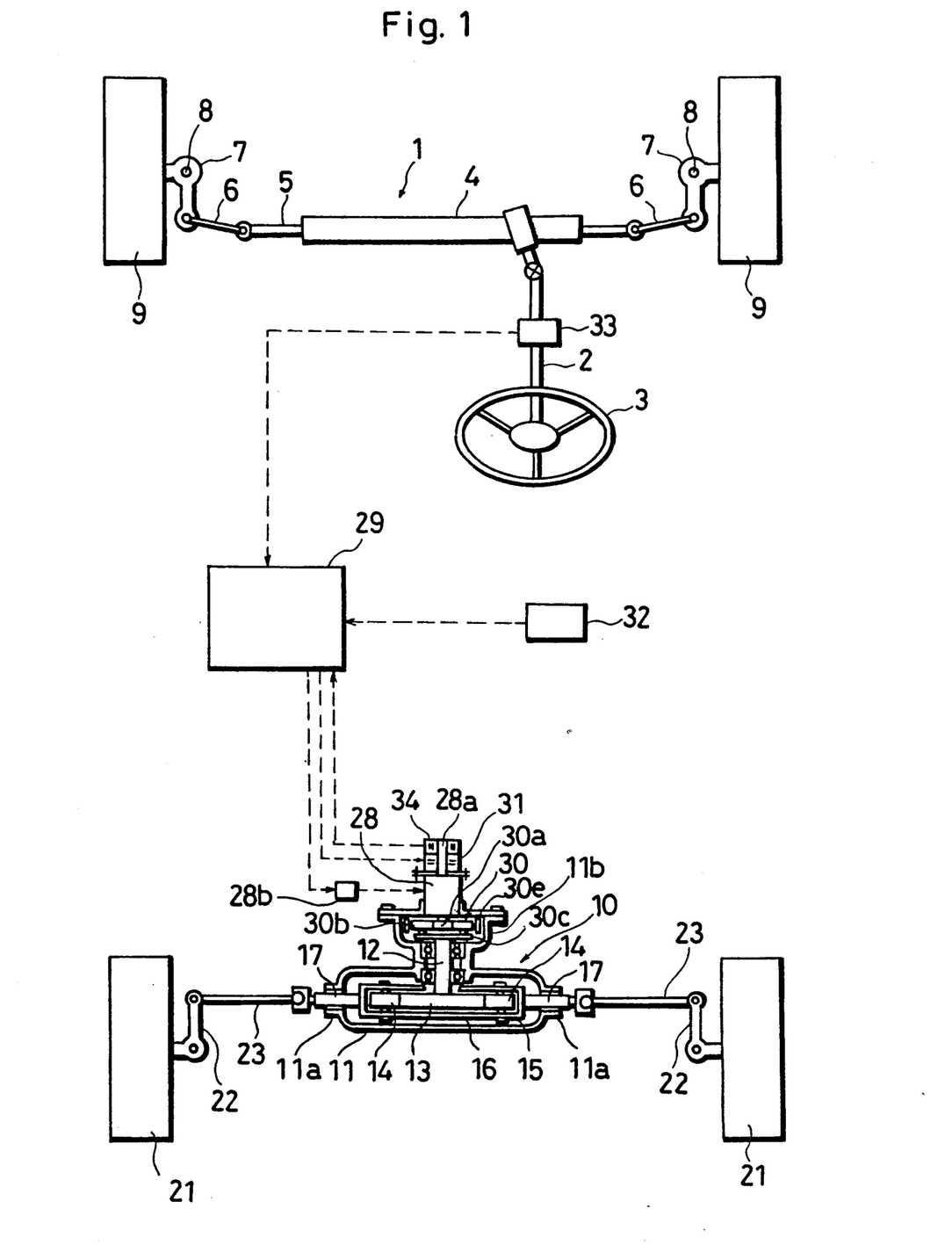
FIG. 1 is an overall view schematically showing a 4WS vehicle which incorporates a rear wheel steering system according to the present invention.

Referring first to FIG. 1 of the accompanying drawings, there is shown a four-wheel steering system which includes a front wheel steering mechanism 1 and a rear wheel steering mechanism 10. The overall steering system may be incorporated into any types of four-wheel automotive vehicles.

According to the illustrated embodiment, the front wheel steering mechanism 1 is of the known rack and pinion type. When the steering wheel 3 is rotated with the steering shaft 2, a rack bar 5 guided in a gear box 4 is moved widthwise of the vehicle. Such movement of the rack bar 5 is transmitted to front tie rods 6 to cause front knuckle arms 7 to pivot about respective axes 8, thereby pivoting the front wheels 9 for directional change.

The rear wheel steering mechanism 10 comprises a casing 11 which extends widthwise of the vehicle and is fixedly supported on the rear axle beam (not shown) of the vehicle body (not shown) for example. A cam plate or disc 13 driven for rotation with an input shaft 12 is arranged in the casing 11 as interposed between a pair of cam follower rollers 14 (see also FIG. 2A to 2C). The cam followers 14 are rotatably supported by a follower support 15 which in turn is slidably supported by the casing 11 to move widthwise of the vehicle. The widthwise movement of the follower support 15 is transmitted through rear tie rods 23 to rear knuckle arms 22 to cause pivotal movement of the rear wheels 21 for directional change.

The follower support 15 includes a support frame 16 surrounding the cam disc 13 within the casing 11, and a pair of slide rods 17 extending from the support frame 16 to be slidably received in the respective end portions 11a of the casing. One end of each rear tie rod 23 is universally connected to the corresponding slide rod 17 by a ball joint, whereas the other end of the tie rod is pivotally pinned to the corresponding rear knucle arm 22.

Figure 3:
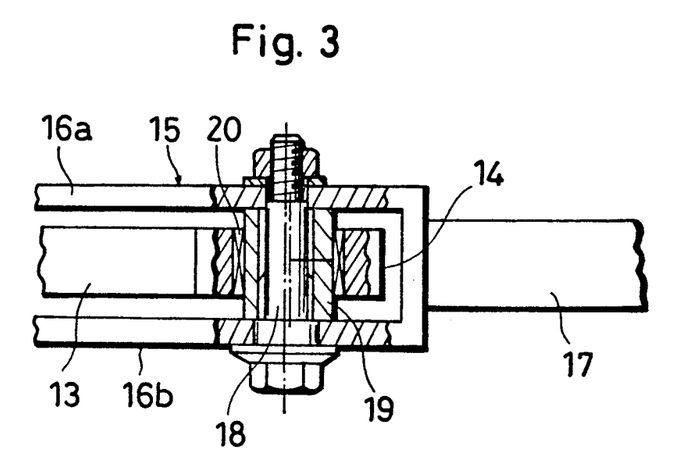
FIG. 3 is an enlarged fragmentary view, partially in section, showing a follower support used to support the cam followers.

As better shown in FIG. 3, the support frame 16 is elongate widthwise of the vehicle, and has a front wall 16a and a rear wall 16b. At each end of the support frame 16, a shaft pin 18 is provided to bridge between the front and rear walls 16a, 16b, and the corresponding follower roller 14 is rotatably supported on the shaft pin 18 via a bush 19 and a bearing 20.

Figure 2A:
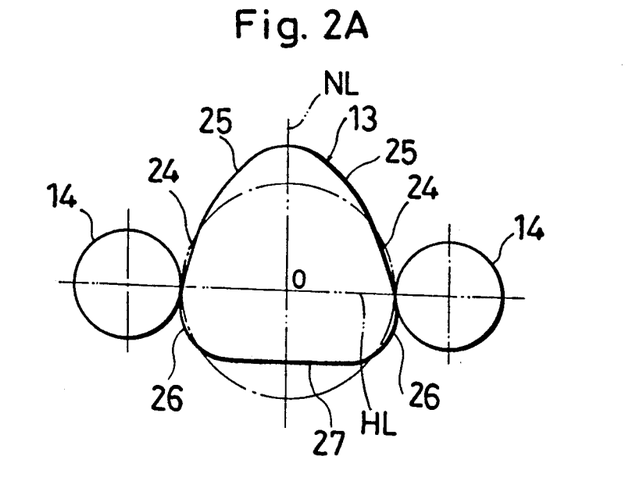
FIGS. 2A to 2C are enlarged fragmentary views showing the movement of a cam disc and cam followers incorporated in the rear wheel steering system illustrated in FIG. 1.
Figure 2B:
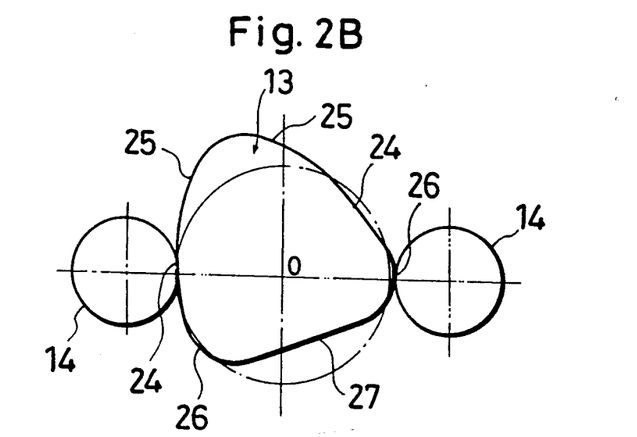
Figure 2C:
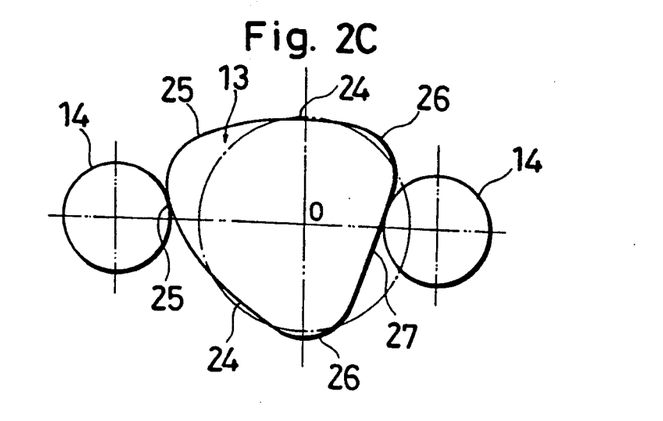

The cam profile of the cam disc 13 is best shown in FIGS. 2A to 2C. The illustrated cam profile causes the pair of follower rollers 14 to move in the following way. When the cam disc is rotated in one direction within a predetermined angular range, the roller pair 14 is caused to displace in one direction (rightward in FIG. 2B when rotated counterclockwise) from the neutral position shown in FIG. 2A. On the other hand, when the cam disc is rotated in the same direction beyond the predetermined angular range (FIG. 2C), the roller pair 14 is caused to displace in the opposite direction (leftward in FIG. 2C when rotated counterclockwise) from the neutral position.

Specifically, the profile of the cam disc 13 is symmetrical with respect to a neutral line NL which is a vertical diametrical line of a reference circle RC, as shown in FIG. 2A. The pair of follower rollers 14 contact the cam disc substantially on a horizontal diametrical line HL of the reference circle RC. In the neutral rotational position (FIG. 2A), the cam disc has a pair of first bulges 26 located immediately below the horizontal diametrical line HL and slightly projecting beyond the reference circle RC. The cam disc also has a pair of first depressions 24 positioned immediately above the horizontal diametrical line HL and slightly retreating inward from the reference circle RC. Further, the first bulges 26 are followed by a second depression 27 which is diametrically opposite a second bulge 25 following the first depressions 24.

The cam disc 13 is made to rotate in response to rotation of the steering wheel 3 (FIG. 1). Thus, such a profile of the cam disc 13 is necessary to insure that the rear wheels 21 pivot in the same phase direction (FIG. 2B) relative to the front wheels 9 when the steering wheel 3 is rotated through a smaller angle, whereas the rear wheels make an opposite phase pivotal movement (FIG. 2C) relative to the front wheels when the steering wheel is rotated through a larger angle.

It should be mentioned here that, according to the present invention, the amount of rotation of the cam disc 13 is determined not only by the rotational amount of the steering wheel 3 but also by the vehicle speed. Thus, the rotational amount of the cam disc is not necessarily in direct proportion to the rotational amount of the steering wheel.

Referring again to FIG. 1, the rear wheel steering mechanism 10 described above is driven by a DC electric motor 28 through a reduction mechanism 30. The electric motor 28 is accompanied by an electromagnetic brake 31 acting on the motor output shaft 28a to stop the motor when necessary. The rotational amount of the motor output shaft 28a is detected by a motor rotation sensor 34.

Figure 4:
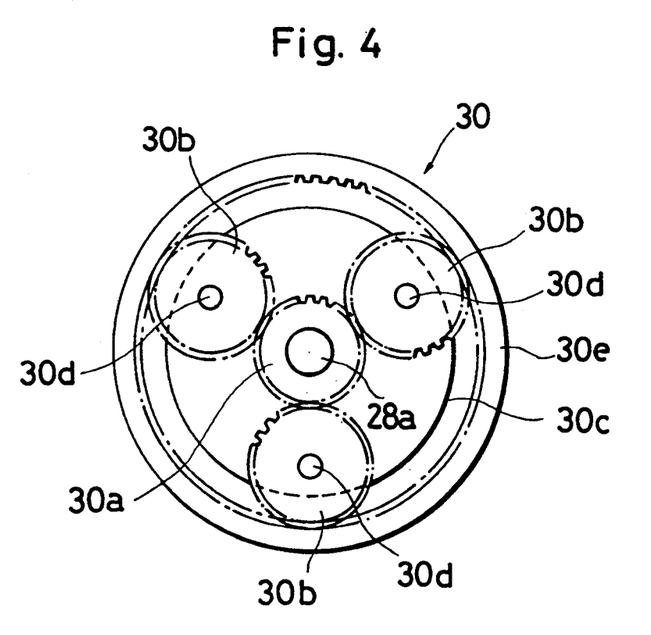
FIG. 4 is a sectional view taken along lines IV—IV in FIG. 1 to show a reduction mechanism of the rear wheel steering system.

As shown in FIGS. 1 and 4, the reduction mechanism 30 is accommodated within a forwardly projecting portion 11b of the casing 11. The reduction mechanism comprises a sun gear 30a mounted on the motor output shaft 28a for rotation therewith, planetary gears 30b held in mesh with the sun gear 30a for revolution therearound while making self-rotation about their respective axis pins 30d, and a ring gear 30e fixed to the casing projecting portion 11b in mesh with the planetary gears 30b. The axis pins 30d of the planetary gears 30b are carried by a carrier disc 30c which is fixed to the input shaft 12 for the rear wheel steering mechanism 10.

With the planetary gear reduction mechanism 30, when the motor output shaft 28a rotates with the sun gear 30a, the planetary gears 30b revolve around the sun gear at a reduced speed. Thus, the carrier disc 30c connected to the planetary gears rotates at the same reduced speed together with the input shaft 12 and the cam disc 13. When the diameters of the sun gear 30a and ring gear 30d are respectively represented as Ds and Dr, the reduction ratio between the motor output shaft 28a and the cam disc 13 is given by the following equation.

$$i = 1 + Dr/Ds$$

Figure 5:
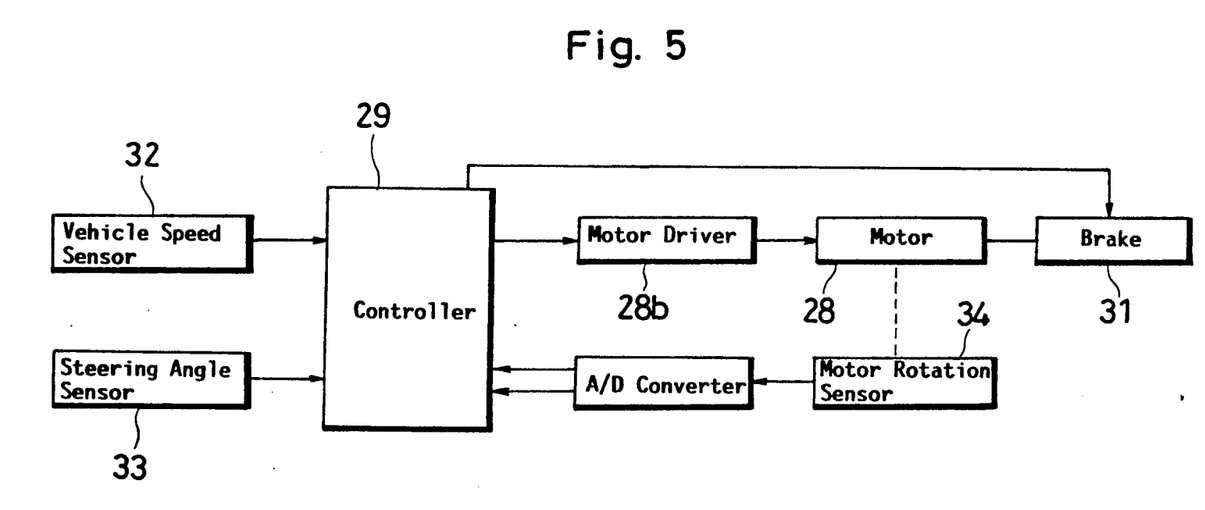
FIG. 5 is a block diagram of the rear wheel steering system.

The electric motor 28 and the electromagnetic brake 31 are controlled by a controller 29 which may be provided by a microcomputer for example. As shown in FIGS. 1 and 5, the controller 29 controls the electric motor 31 through a motor driver 28b. The signals from the motor rotation sensor 34 is fed back upon A/D conversion to the controller for use to suitably control the motor and the brake. The controller further receives the signals from a vehicle speed sensor 32 and a steering angle sensor 33 to use the signals for controlling purposes. The steering angle sensor 33 detects the rotational direction and amount (angle) of the steering wheel 3 to notify the pivotal direction and amount (angle) of the front wheels 9. The term "angle" as used herein includes the concept of direction because the rotational direction can be recognized by whether the detected angle is positive or negative.

The controller 29 incorporates various process elements. These elements are now described with reference to FIG. 6.

Figure 6:
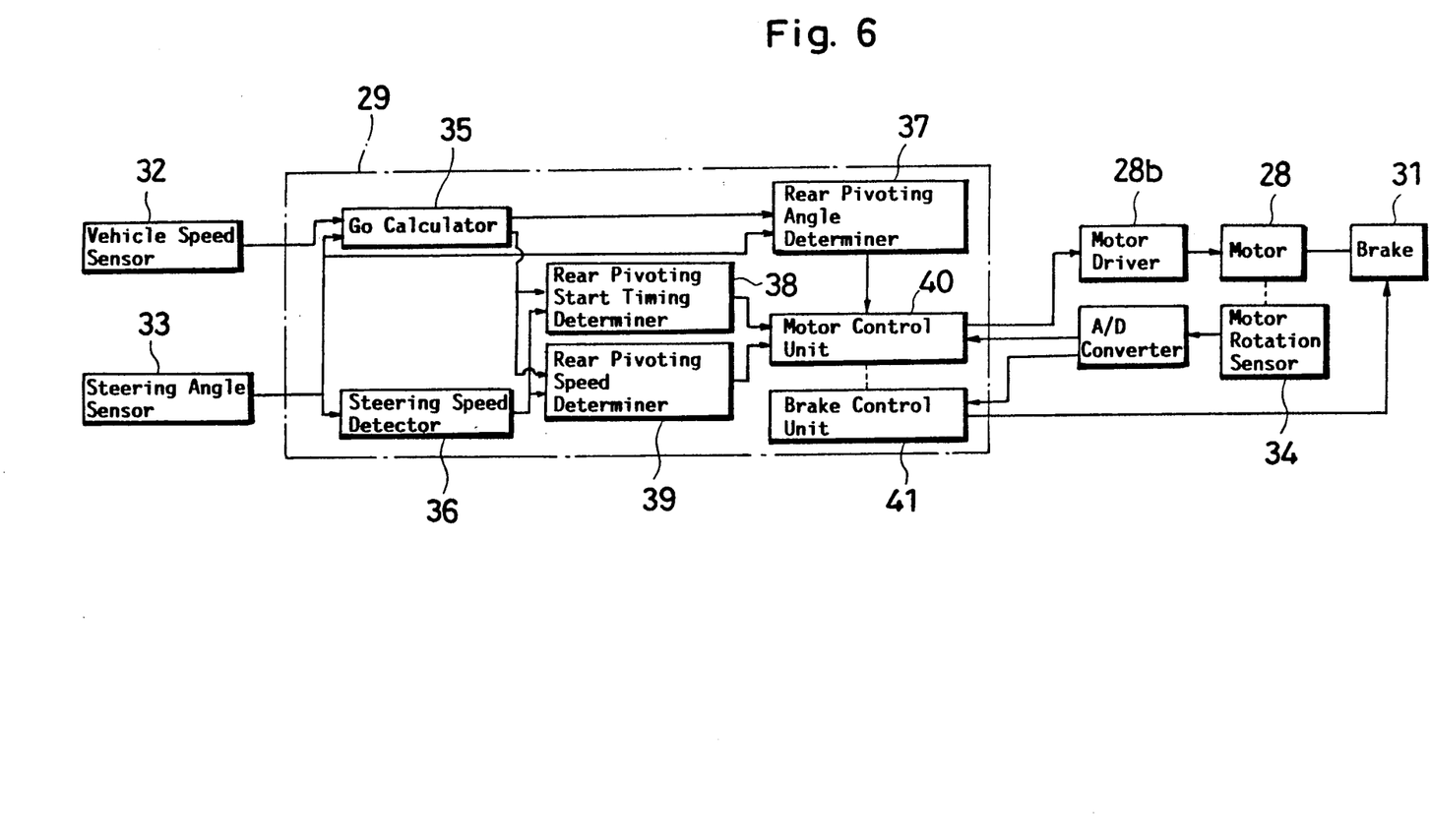
FIG. 6 is also a block diagram of the rear wheel steering system to show a more specific arrangement for a controller.

A first process element of the controller 29 is a lateral acceleration force calculator 35. This calculator receives the information from the vehicle speed sensor 32 and the steering angle sensor 33 to calculate, on real time, a theoretical lateral acceleration force Go acting on the gravitational center of the vehicle. The lateral acceleration force calculated by the Go calculator is a function of the front wheel pivotal angle $\theta$ and the vehicle speed V. This acceleration force may be approximated by the following equation.

$$Go = \theta \cdot (V^2/l)/(1 + K \cdot V^2)$$

where l is the wheel base of the vehicle (namely the distance from the front wheels 9 to the rear wheels 21), while K is a correction coefficient.

A second process element of the controller 29 is a steering speed detector 36 which differentiates the output of the steering angle sensor 33 to calculate the rotational speed of the steering wheel 3. In other words, this detector notifies how quickly the steering wheel has been rotated.

A third process element of the controller 29 is a rear pivoting angle determiner 37 which determines the pivotal direction and amount (angle) for the rear wheels 21, namely the rotational direction and amount for the motor 28, on the basis of the output from the Go calculator 35.

A fourth process element of the controller 29 is a rear pivoting start timing determiner 38 which receives the outputs from the Go calculator 35 and the steering speed detector 36 to determine the timing for starting pivotal movement of the rear wheels 21, namely the timing for starting the motor 28. Specifically, the timing determiner 38 causes the rear wheels 21 to start a same phase pivotal movement with a delay relative to the start of rotation of the steering wheel 3 (namely the start of pivotal movement of the front wheels 9). The timing determiner also causes the rear wheels, which have already made a same phase pivotal movement, to start returning to the neutral position with a delay relative to the start of return steering rotation of the steering wheel. A larger delay is set by the timing determiner as the steering speed calculated by the detector 36 becomes larger.

Figure 9:
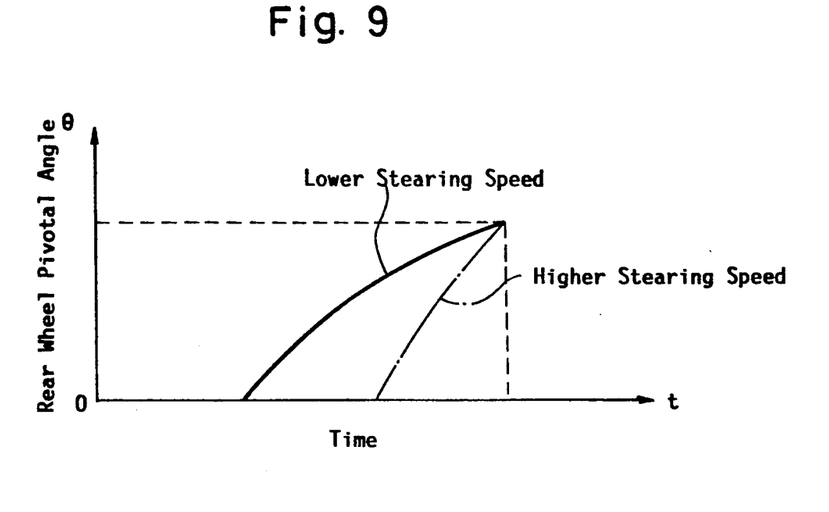
FIG. 9 is a graph showing the relation between time and rear wheel pivotal angle.

A fifth process element of the controller 29 is a rear pivoting speed determiner 39 which receives the outputs from the Go calculator and the steering speed detector 36 to determine the speed at which the rear wheels 21 are pivoted. Specifically, the rear pivoting speed determiner 39 causes the rear wheels to make a same phase pivotal movement at a higher speed for a higher speed rotation of the steering wheel 3. As described above, due to the function of the rear pivoting start timing determiner 38, a higher speed rotation of the steering wheel results in a larger starting delay for pivotal movement of the rear wheels. On the other hand, the function of the rear pivoting speed determiner 39 is such as to compensate for the delay by increasing the pivoting speed of the rear wheels. Thus, as long as the target pivotal angle for the rear wheels is the same, the rear wheels pivot through the target angle within the same time regardless of the initial delay relative to the start of the steering rotation (front wheel pivoting), as shown in FIG. 9.

A sixth process element of the controller 29 is a motor control unit 40 which receives the output from the rear pivoting angle determiner 37 as well as the feed-back signal from the motor rotation sensor 34 to determine the rotational direction and amount for the motor 28 and to control the motor driver 28b accordingly. The motor control unit also receives the outputs from the rear pivoting start timing determiner 38 and the rear pivoting speed determiner 39. Thus, the motor control unit causes the motor 28 to start rotating at the timing determined by the timing determiner 38 and at the speed determined by the speed determiner 39.

A seventh (last) element of the controller 29 is a brake control unit 41. The brake control unit receives the output from the motor rotation sensor 34 to actuate the brake 31 for stopping the motor 28 when the motor has rotated by a predetermined amount.

Next, an example of controlling the rear wheel steering system is described with reference to FIGS. 1, 6 and 7, particularly FIG. 7.

First, the vehicle speed and the steering information (rotational direction and angle) about the steering wheel 3 are read out respectively from the vehicle speed sensor 32 and the steering angle sensor 33 (Blocks S101 and S102 in FIG. 7) to calculate the lateral acceleration force Go (Block S103). Further, the steering angle information is also used to calculate the steering (rotational) speed of the steering wheel (Block S104). The Go and steering speed thus calculated are used to control the motor 28 for suitably pivoting the rear wheels 21 in the following manner.

When the calculated Go is no larger than 0.1 G (G: gravitational acceleration) with the rotational angle of the steering wheel 3 being no less than 240° (equally Yes for Blocks S105, S106 and S107), the rear wheels 21 are caused to make an opposite phase pivotal movement (Block S108). Preferably, the opposite phase pivotal angle of the rear wheels, which is determined by the rear pivoting angle determiner 37, should increase as the rotational angle of the steering wheel increases. This manner of rear wheel pivoting, which is opposite in direction to the front wheel pivoting, is suitable for making a U-turn with a small turning radius while running at a low speed. It should be appreciated that the pivotal angle of the front wheels 9 may be calculated by dividing the rotational angle of the steering wheel 3 by the overall gear ratio of the front wheel steering mechanism 1.

On the other hand, when the Go is no larger than 0.1 G with the steering angle being less than 240° (Yes for Blocks S105 and S106 but No for Block S107), or the Go is no larger than 0.2 G but greater than 0.1 G (Yes for Block S105 but No for Block S106), the rear wheels 21 are held to stay at the neutral pivotal position. This control mode is suitable for realizing stability while running at a medium speed (e.g. about 40 km/hr). Indeed, it is known that pivoting of the rear wheels, either in the same phase or opposite phase direction relative to the front wheels, is ineffective for improving the vehicle controllability when the vehicle is driving at a medium speed.

When the calculated Go is larger than 0.2 G (No for Block S105), the rear pivoting start timing determiner 38 and the rear pivoting speed determiner 39 respectively determine the pivoting start timing and the pivoting speed for the rear wheels 21 (Blocks S110 and S111). In this control mode, the rear wheels are caused to make a same phase pivotal movement relative to the front wheels 9, and the same phase pivotal angle of the rear wheels is controlled depending on the magnitude of the calculated Go (Blocks S112–S118).

Figure 7:
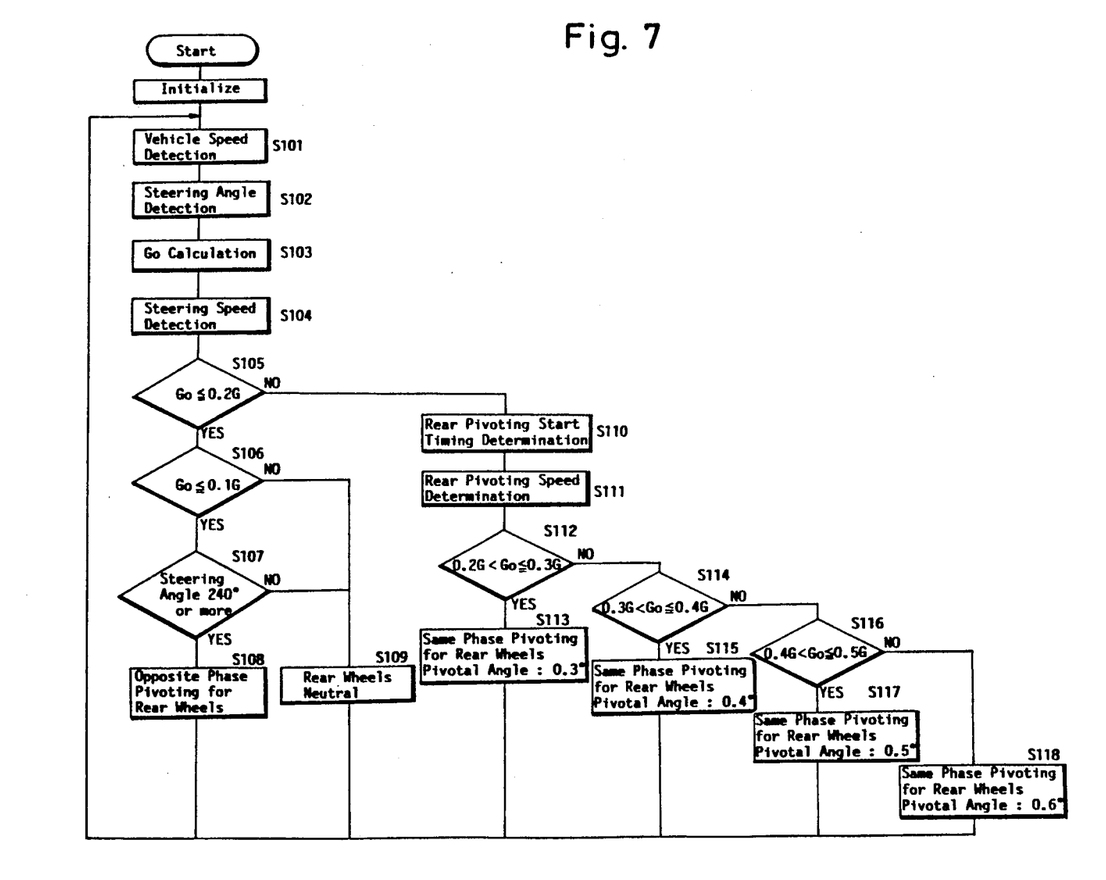
FIG. 7 is a control flow chart for the rear wheel steering system.

The control mode represented by Blocks S110–S118 in FIG. 7 is desirable for improving the vehicle controllability in cornering or lane-shifting at a high speed. In this control mode, the rear wheels 21 are pivoted in the same direction as the front wheels 9. Thus, the side force from the ground is born not only by the front wheels but also by the rear wheels, so that the lateral slippage at the rear portion of the vehicle is effectively prevented to enable quick directional change of the vehicle. Further, the same phase pivotal angle of the rear wheels is increased as the Go increases (see Blocks S112–S118). Obviously, the vehicle will have a stronger tendency to slip laterally as the lateral acceleration force increases, thus requiring a larger same phase pivotal angle for the rear wheels to prevent lateral slippage.

In the control mode represented by Blocks S110–S118, the pivotal direction and angle for the rear wheels are determined by the rear pivoting angle determiner 37. Using the output from the angle determiner 37, the motor control unit 40 controls the rotation of the motor 28 through the intermediary of the motor driver 28b, thereby rotating the cam disc 13 in a suitable direction through a suitable angle until the rear wheels 21 assume the target pivotal position determined by the rear pivoting angle determiner 37.

According to the present invention, the DC electric motor 28 and the electromagnetic brake 31 are controlled in a specific way. Next, an example of controlling for the motor and the brake is described with reference to FIGS. 1, 6 and 8, particularly FIG. 8.

Figure 8:
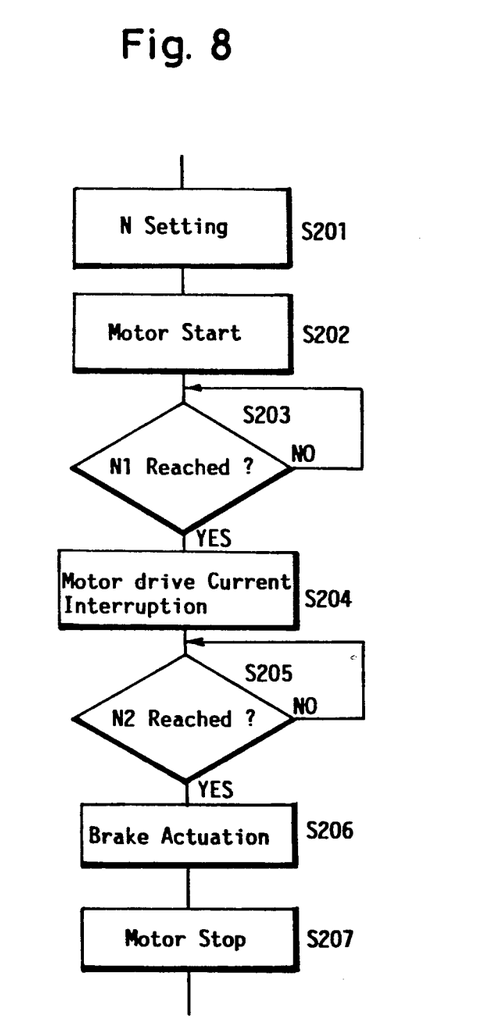
FIG. 8 is also a control flow chart showing how to control a cam driving motor and a brake for the motor.

Upon receiving the output from the rear pivoting angle determiner 37, the motor control unit 40 sets a target rotational amount N corresponding to the target pivotal angle for the rear wheels 21 (Block S201 in FIG. 8). Then, the motor control unit, through the motor driver 28b, causes the motor 28 to rotate in a predetermined direction and at a predetermined speed (Block S202). The actual rotational amount of the motor 28 is detected by the motor rotation sensor 34 to feed back the detected amount to the motor control unit 40 and the brake control unit 41.

When the detected rotational amount of the motor 28 reaches a first value N1 (N1<N) which is relatively close to the target rotational amount N (Yes for Block S203), the motor control unit 40 functions to shut off the drive current to the motor (Block S204). However, the motor continues to rotate by inertia.

When the detected rotational amount of the inertially rotating motor 28 reaches a second value N2 (N1<N2<N) which is even closer to the target rotational amount N (Yes for Block S205), the brake control unit 41 functions to actuate the brake 31 (Block S206). As a result, the motor is forcibly stopped (Block S207).

The electromagnetic brake 31 has such a braking ability as to completely stop the motor 28 within a short time of e.g. 0.05 seconds when the motor is inertially rotating at a speed of e.g. 1,500 rpm. Thus, when N=5 for example, the drive current to the motor 28 may be interrupted at N1=4.5 for example, and the brake 31 may be actuated at N2=4.8 for example. In this way, it is possible to stop the motor substantially accurately at the target rotational amount N=5, thereby bringing the rear wheels 21 to the target pivotal position determined by the rear pivoting angle determiner 37.

In actual driving, the pivotal control for the rear wheels 21 is performed on the real-time basis because the driving situation changes constantly. Thus, the calculated lateral acceleration force Go is constantly renewed, and the target pivot angle or position for the rear wheels is correspondingly renewed. The rear wheel pivotal control is such that the rear wheels are constantly brought to the renewed target pivotal position.

According to the embodiment described above, the timing for starting the same phase pivotal movement of the rear wheels 21 is slightly delayed relative to the start of rotating the steering wheel 3 (due to the function of the rear pivoting start timing determiner 37), and the degree of such a pivotal delay is rendered greater as the steering wheel is rotated at a higher speed. This manner of pivotal control is preferred for the following reason.

The same phase pivotal movement of the rear wheels 21 is effective for preventing lateral slippage of the vehicle at the time of driving in a gentle curve or lane-shifting at a high speed. However, the same phase pivotal movement of the rear wheels simultaneously restrains yawing (rotation about a vertical axis) of the vehicle. In fact, such yawing is required to a certain extent to suitably orient the vehicle for cornering or lane-shifting although excessive yawing must be avoided to prevent the vehicle from spinning due to slippage of the rear wheels. A pivotal delay for the rear wheels causes the vehicle to yaw suitably for cornering or lane-shifting at the initial stage of rotating the steering wheel 3. Immediately thereafter, the rear wheels make a same phase pivotal movement to prevent lateral slippage and excessive yawing of the vehicle. A longer pivotal delay of the rear wheels is set for higher speed rotation of the steering wheel because a greater degree of vehicle yawing is needed for cornering along a steeper curve.

Yawing, to a suitable extent, of the vehicle is necessary not only for changing from straight-driving to curve-driving, but also for changing from curve-driving to straight-driving. Thus, according the illustrated embodiment, a similar pivotal delay is provided for the rear wheels also at the time of rotationally returning the steering wheel to its neutral position, as already described.

Further, according to the present invention, the same phase pivotal speed of the rear wheels 21 is rendered higher for higher speed rotation of the steering wheel 3 (due to the function of the rear pivoting speed determines 39). Thus, in spite of the difference in length of the initial pivotal delay, the rear wheels may be made to assume the target pivotal position substantially within a constant time from the start of rotating the steering wheel. As a result, it is possible to reliably prevent lateral slippage of the vehicle without a delay while also insuring a suitable degree of vehicle yawing (as required for suitably orienting the vehicle) by intentionally delaying the start timing for the rear wheel pivotal movement in accordance with the magnitude of the lateral acceleration force Go.

The control flow chart shown in FIG. 7 only indicates roughly divided reference values for comparison with the detected Go (see Blocks S105, S106, S112, S114 and S116). However, it is of course possible and desirable to use more finely divided reference values for comparison with the Go, thereby further improving the driving controllability of the vehicle.

Figure 10:
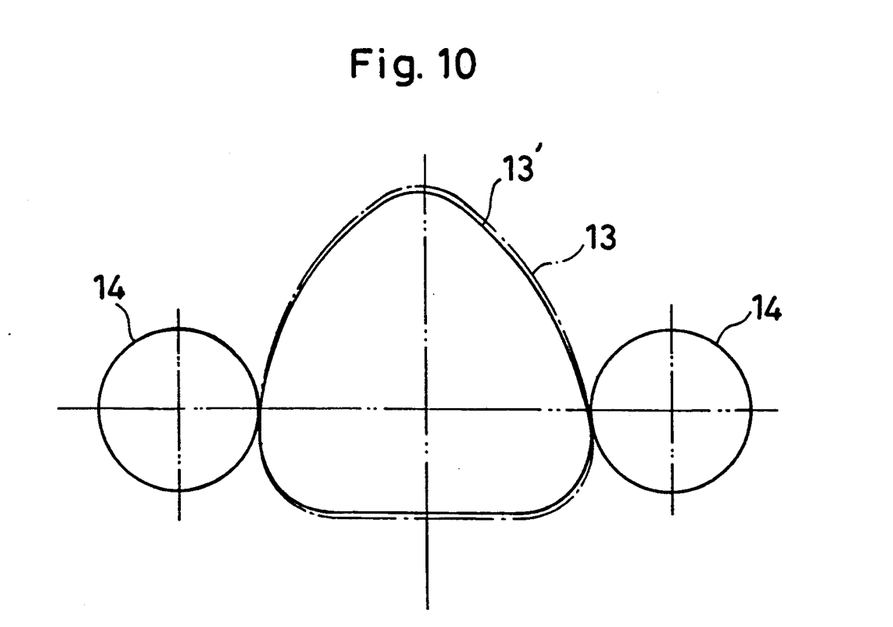
FIG. 10 is a fragmentary view showing another cam disc to be incorporated in the rear wheel steering system.

FIG. 10 shows a modified cam disc 13' which slightly differs in profile from an ideally or theoretically configured cam disc 13. The ideal cam disc 13 is such that it always comes into intimate contact with both of the follower rollers 14 in any rotational positions thereof. However, the production of the ideal cam disc is very costly, but yet the actual profile of the cam disc unavoidably deviates slightly from the ideality due to production errors. Obviously, such a profile deviation may impair smooth rotation of the disc between the pair of follower roller 14 because of jamming.

In FIG. 10, the modified cam disc 13' is shown to have a profile (indicated by the solid line) which is slightly retreated inwardly from that of the ideally configured cam disc 13 (indicated by the broken line). Such a cam profile allows for production errors at the sacrifice of ideality in cam function. In other words, the modified cam disc 13' can always rotate smoothly between the pair of follower rollers without jamming engagement therewith even if the cam disc is manufactured relatively roughly with respect to its cam profile. Further, the modified cam disc 13' can be manufactured at a lower cost than the ideal cam disc 13.

Figure 11:
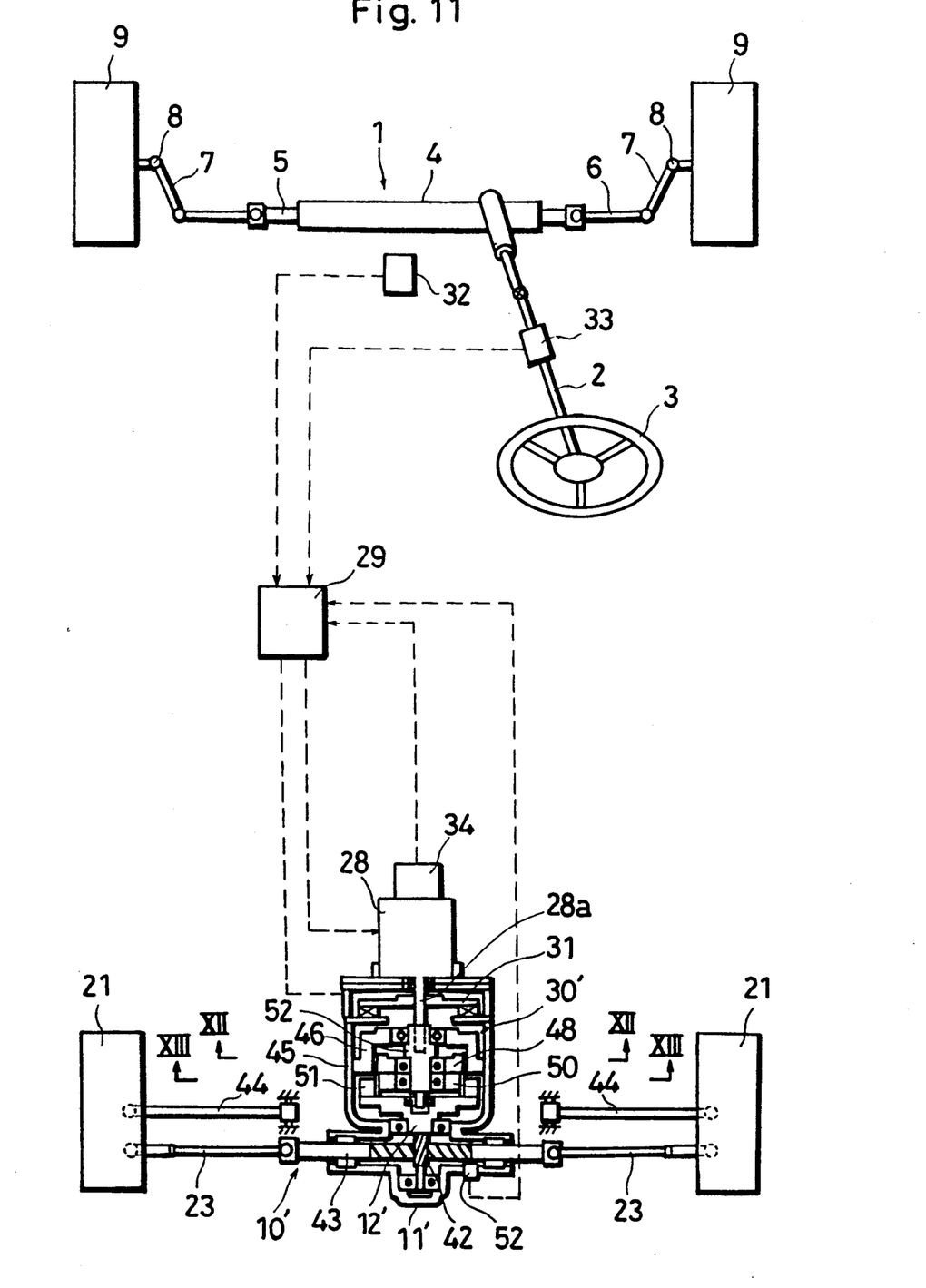
FIG. 11 is an overall view schematically showing another 4WS vehicle which incorporates a modified rear wheel steering system according to the present invention.

FIG. 11 shows another 4WS vehicle comprising a modified rear wheel steering system which includes a rack-and-pinion type rear wheel steering mechanism 10', and a non-retrodirective reduction mechanism 30' for transmitting the drive force of the motor 28 to the rear wheel steering mechanism 10'. The term "non-retrodirective reduction mechanism" as used herein means that the reduction mechanism allows transmission of a force only from the motor 28 to the rear wheel steering mechanism 10' but not in the opposite direction.

Specifically, the rear wheel steering mechanism 10' comprises a pinion 42 which is fixed to an input shaft 12' for rotation therewith and held in mesh with a rack bar 43. The rack bar is slidably supported by a casing 11'. Both ends of the rack bar 43 are universally connected to respective rear tie rods 23 which in turn are universally connected to the respective rear wheels 21. A pair of link rods 44, which are supported by the vehicle body (only partially shown) and extends substantially in parallel to the respective tie rods 23, are pivotally connected to the respective rear wheels 21. Thus, when the rack bar 43 is slidably moved widthwise of the vehicle, the rear wheels 21 are caused to pivot for directional change.

Figure 12:
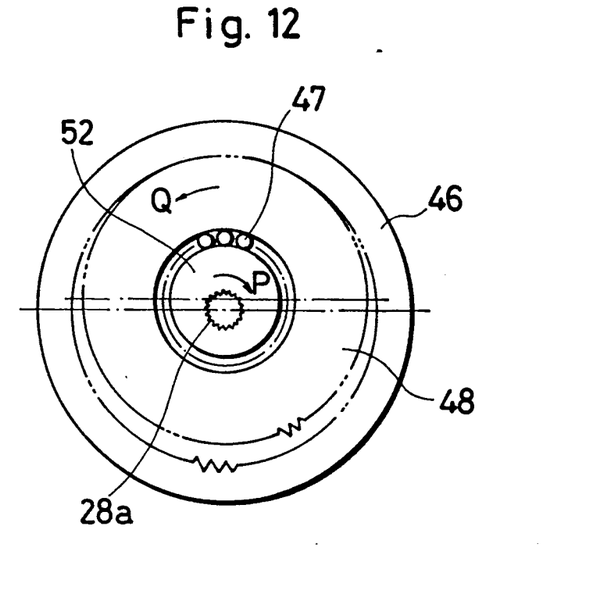
FIG. 12 is a sectional view taken on lines XII—XII in FIG. 11.
Figure 13:
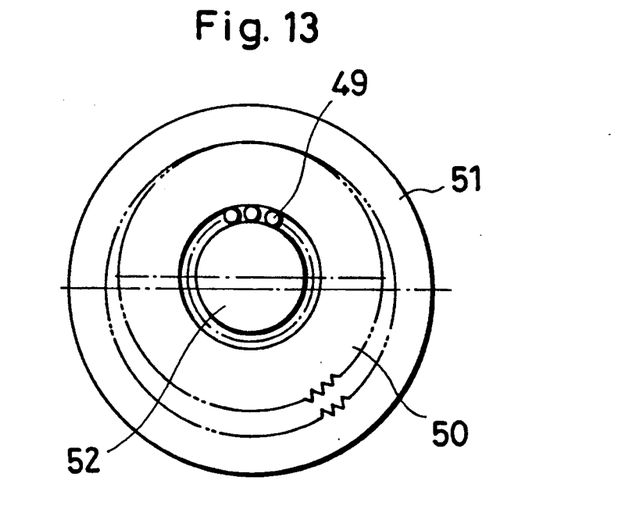
FIG. 13 is a sectional view taken on lines XIII—XIII in FIG. 11.

As shown in FIGS. 11 to 13, the non-retrodirective reduction mechanism 30' may be embodied as a hypocycloidal drive gear mechanism. Specifically, the reduction mechanism 30', which is accommodated in a gear box 45 fixed to or integral with the casing 11' for the rear wheel steering mechanism 10', comprises an eccentric shaft 52 fixed to the output shaft 28a of the motor 28, and a first ring gear 46 fixedly mounted in the gear box 45. The first ring gear 46 is held in mesh with a first inner gear 48 which is rotatably supported on the eccentric shaft 52 via a bearing 47. A second inner gear 50 is also rotatably supported on the eccentric shaft 52 via another bearing 49 and fixed to the first inner gear 48 for co-rotation therewith. The second inner gear 50 is in mesh with a second ring gear 51 which is fixed to the input shaft 12' for co-rotation therewith. The two ring gears 46, 51 are coaxial with the input shaft 12'.

The outer diameters of the two inner gears 48, 50 are smaller than the respective inner diameters of the two ring gears 46, 51, as shown in FIGS. 12 and 13. However, due to the eccentricity of the eccentric shaft 52 relative to the motor output shaft 28a, the two inner gears 48, 50 can be held internally tangent to the respective ring gears 46, 51. The number of teeth of the first inner gear 48 is slightly smaller than that of the first ring gear 46, whereas the number of teeth of the second inner gear 50 is equal to that of the second ring gear 51.

When the motor output shaft 28a rotates with the eccentric shaft 52 in the direction of an arrow P in FIG. 12, the first inner gear 48 rotates on the eccentric shaft 52 while tangentially rolling along the first ring gear 46 in mesh therewith. Assuming that the numbers of teeth of the first ring gear 46 and first inner gear 48 are respectively represented by $Z1$ and $Z2$ ($Z1 > Z2$), a single rotation, in the arrow P direction in FIG. 12, of the eccentric shaft 52 causes the first inner gear 48 to rotate in the opposite direction Q by an amount of $(Z2 - Z1)/Z1$ relative to the first ring gear 46 which is fixed. Thus, when $Z1 = 81$ and $Z2 = 80$ for example, the rotation of the eccentric shaft 52 (the motor output shaft 28a) is reduced to 1/80 when transmitted to the first inner gear 48.

The second inner gear 50 co-rotates with the first inner gear 48 (because of fixed connection therebetween) while tangentially rolling along the seond ring gear 51. However, since the second inner gear 50 has the same number of teeth as the second ring gear 51, there is no relative rotation between the second inner gear and the second ring gear. Thus, the second ring gear 51, which is fixed to the input shaft 12' for the rear wheel steering mechanism 10', also co-rotates with the first inner gear 48 (the second inner gear 50 as well) to drive the pinion 42, consequently causing the rack bar 43 to move widthwise of the vehicle.

As described above, the hypocycloidal reduction mechanism 30' is capable of providing a very high reduction ratio (e.g. 80 or more), and therefore considered substantially non-retrodirective. In other words, the transmitted force flow within the reduction mechanism is only from the motor output shaft 28a to the second ring gear 51 but not in the reverse direction. Thus, the rear wheels 21 can be reliably held at a controlled pivotal position even if the cornering force (or the side force) tends to pivotally return the rear wheels.

As shown in FIG. 11, the controller 29 controls the motor 28 and the brake 31 substantially in the same manner as already described. Preferably, the position of the rack bar 43 may be detected by a lateral position sensor 52 to feed a confirmation signal to the controller 29, thereby backing up the function of the motor rotation sensor 34.

In either of the foregoing embodiments, the electromagnetic brake 31 is preferably of the normal-on type which performs a braking operation when no electric current is supplied thereto. In other words, the brake 31 is normally held in a braking condition without any electricity consumption to prevent rotation of the motor 28 (namely movement of the rear wheel steering mechanism 10 or 10' connected thereto), whereas the brake takes a non-braking condition for allowing rotation of the motor only when an electric current is supplied to the brake. Thus, the brake can be utilized to continue braking the motor 28 (namely holding the rear wheels 21 at a controlled pivotal postion) in addition to limiting inertial rotation of the motor for accurately bringing the rear wheels to the controlled pivotal position.

If, on the other hand, the brake 31 is of the normal-off type which performs a braking operation only when the an electric current is supplied thereto, it is necessary to continue supplying the electric current in order to maintain the braking condition of the brake. In actual driving, however, the total period in which the motor 28 is rotated is much shorter than the total period in which the motor is not rotated because the rear wheels 21 are usually held at the neutral position most of the time. Thus, in view of the electricity comsumption (namely the battery load), it is impractical to utilize the normal-off type brake for continuously braking the motor which has already stopped. For this reason, the normal-off type brake should perform the sole function of stopping the inertially rotating motor, after which the brake should be deactivated to avoid an unacceptable battery load. It should be appreciated, however, that a normal-off type brake becomes acceptable if the reduction mechanism has a non-retrodirective nature because the rear wheels can be reliably held at a controlled pivotal position by such a reduction mechanism alone.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. A rear wheel steering system for a vehicle comprising:
    a controller to which driving information is supplied;
    a DC electric motor which is rotationally controlled by said controller;
    a motor rotation sensor for detecting the rotational amount of said motor from a neutral position and feeding the detected rotational amount to said controller;
    a brake controlled by said controller for suitably braking said motor;
    a reduction mechanism connected to said motor; and
    a rear wheel steering mechanism connected to said reduction mechanism for pivoting the vehicle rear wheels in accordance with the rotational amount of said motor;
    wherein said controller comprises means for interrupting drive current to said motor when the detected rotational amount of said motor reaches a first value short of a target rotational amount set by said controller, said controller also comprising means for subsequently actuating said brake when the detected rotational amount of said motor reaches a second value between said first value and said target rotational amount.

2. A system as defined in claim 1, wherein said brake is an electromagnetic brake which performs a braking operation when an electric current is supplied thereto.

3. A system as defined in claim 1, wherein said brake is an electromagnetic brake which performs a braking operation when no electric current is supplied thereto.

4. A system as defined in claim 1, wherein said rear wheel steering mechanism comprises: a casing mounted to the vehicle body; an input shaft rotatably supported by said casing and rotated by said motor through said reduction mechanism; a cam member fixed to said input shaft for rotation therewith; a follower support slidably supported by said casing to be movable widthwise of the vehicle; a pair of cam followers rotatably supported by said follower support with said cam member interposed therebetween so that rotation of said cam member causes said follower support to move widthwise of the vehicle; and means for converting the widthwise movement of said follower support into pivotal movement of said rear wheels.

5. A system as defined in claim 4, wherein said cam member is a cam disc symmetrical with respect to a neutral diametrical line passing through said input shaft, said cam disc having such a cam profile as to move one cam follower away from said input shaft while moving the other cam follower toward said input shaft when said cam disc is rotated in one rotational direction within a predetermined angular range from a neutral position, said cam profile being at least partially retreated slightly inwardly from a theoretical cam profile.

6. A system as defined in claim 5, wherein said cam profile of said cam disc being further such as to move said one cam follower toward said input shaft while moving said other cam follower away from said input shaft when said cam disc is rotated in said one direction beyond said predetermined angular range.

7. A system as defined in claim 1, wherein said rear wheel steering mechanism comprises: a casing mounted to the vehicle body; an input shaft rotatably supported by said casing and rotated by said motor through said reduction mechanism; a pinion fixed to said input shaft for rotation therewith; a rack bar held in mesh with said pinion and slidably supported by said casing to be movable widthwise of the vehicle; and means for converting the widthwise movement of said rack bar into pivotal movement of said rear wheels.

8. A system as defined in claim 1, wherein said reduction mechanism comprises: a sun gear rotated by said motor; planetary gears held in mesh with said sun gear for revolution therearound while making self-rotation; a ring gear fixed rotationally and held in mesh with said planetary gears; and a carrier rotatably carrying said planetary gears for revolution about said sun gear together with said planetary gears, said carrier being connected to said rear wheel steering mechanism.

9. A system as defined in claim 1, wherein said reduction mechanism is non-retrodirective to allow force transmission only from said motor to said rear wheel steering mechanism while prohibiting force transmission from said rear wheel steering mechanism to said motor.

10. A system as defined in claim 9, wherein said non-retrodirective reduction mechanism comprises: an eccentric shaft rotated by said motor; a fixed ring gear; and an inner gear held internally tangent to said ring gear in mesh therewith and rotatably supported on said eccentric shaft, the number of teeth of said inner gear being slightly smaller than that of said ring gear.

11. A system as defined in claim 10, wherein said non-retrodirective reduction mechanism further comprises: a second ring gear connected to said rear wheel steering mechanism; and a second inner gear held internally tangent to said second ring gear in mesh therewith and rotatably supported on said eccentric shaft for co-rotation with the first-mentioned ring gear, the number of teeth of said second inner gear being the same as that of said second ring gear.

12. A method of controlling a rear wheel steering system for a vehicle, said system comprising: a controller to which driving information is supplied; a DC electric motor which is rotationally controlled by said controller; a motor rotation sensor for detecting the rotational amount of said motor from a neutral rotational position and feeding the detected rotational amount to said controller; a brake controlled by said controller for suitably braking said motor; a reduction mechanism connected to said motor; and a rear wheel steering mechanism connected to said reduction mechanism for pivoting the vehicle rear wheels in accordance with the rotational amount of said motor; wherein said method comprises the steps of:

causing said controller to determine a target pivotal angle for the rear wheels on the basis of the driving information;

causing said controller to interrupt drive current to said motor when the detected rotational amount of said motor reaches a first value short of a target rotational amount corresponding to said target pivotal angle; and subsequently causing said controller to actuate said brake when the detected rotational amount of said motor reaches a second value between said first value and said target rotational amount.

13. A method as defined in claim 12, wherein said controller is made to calculate lateral acceleration force acting on the vehicle on the basis of the driving information, said controller causing the vehicle rear wheels to pivot in the same phase direction relative to the vehicle front wheels when the calculated later acceleration force is larger than a predetermined value.

14. A method as defined in claim 13, wherein when the calculated lateral acceleration force is larger than said predetermined value, said controller causes the rear wheels to pivot to and from a neutral pivotal position with a start timing delay relative to pivotal movement of the front wheels.

15. A method as defined in claim 14, wherein said controller sets a larger start timing delay for the rear wheels as the front wheels are pivoted more quickly.

16. A method as defined in claim 15, wherein said controller is further made to determine a steering speed at which a vehicle steering wheel is rotated, said controller causing the rear wheels to pivot at a higher speed for a higher steering speed when the calculated lateral acceleration force is larger than said predetermined value.

* * * * *